(12) United States Patent
Munz et al.

(10) Patent No.: US 8,631,667 B2
(45) Date of Patent: Jan. 21, 2014

(54) ADSORPTION HEAT PUMP WITH HEAT ACCUMULATOR

(75) Inventors: Gunther Munz, St. Peter (DE); Ferdinand Schmidt, Freiburg (DE); Tomas Nunez, Freiburg (DE); Lena Schnabel, Freiburg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1050 days.

(21) Appl. No.: 12/441,673

(22) PCT Filed: Sep. 14, 2007

(86) PCT No.: PCT/EP2007/008021
§ 371 (c)(1),
(2), (4) Date: Jun. 12, 2009

(87) PCT Pub. No.: WO2008/034561
PCT Pub. Date: Mar. 27, 2008

(65) Prior Publication Data
US 2009/0282846 A1    Nov. 19, 2009

(30) Foreign Application Priority Data

Sep. 18, 2006   (DE) .................... 10 2006 043 715

(51) Int. Cl.
*F25B 15/00* (2006.01)
(52) U.S. Cl.
USPC .......................................................... 62/476
(58) Field of Classification Search
USPC ............ 62/235.1, 476, 480, 238.3, 477, 479, 62/481
See application file for complete search history.

(56) References Cited

U.S. PATENT DOCUMENTS 2,486,833 A    11/1949   Freund
4,034,569 A *  7/1977   Tchernev ............... 62/235.1
(Continued)

FOREIGN PATENT DOCUMENTS

DE    9002016      4/1990
DE    3905874 C2   8/1990
(Continued)

OTHER PUBLICATIONS

English-language translation of Japanese Office Action in related application JP2009-528628 dated Feb. 2, 2012.
(Continued)

*Primary Examiner* — Melvin Jones
(74) *Attorney, Agent, or Firm* — Greenblum & Bernstein, P.L.C.

(57) ABSTRACT

System including an adsorption heat pump with at least one adsorber and at least one heat accumulator and method for operating an adsorption heat pump. The system additionally includes a heat source configured to provide heat for a desorption at a temperature that is at least one of higher than temperature levels achievable through previous adsorption cycles in the at least one heat accumulator and not available in a predetermined quantity in the at least one heat accumulator. The at least one heat accumulator is structured and arranged to simultaneously store heat at different temperature levels therein. Adsorption heat released during an adsorption, which is not to be used for a later desorption, is dissipated to a heat sink. Adsorption heat to be used for the later desorption is stored in the heat accumulator at a temperature dependent on an adsorption temperature. Desorption heat is extractable at least in part from the at least one heat accumulator at a desired temperature.

35 Claims, 1 Drawing Sheet

(56) References Cited

U.S. PATENT DOCUMENTS

| | | | |
|---|---|---|---|
| 4,070,870 A * | 1/1978 | Bahel et al. | 62/235.1 |
| 4,178,989 A * | 12/1979 | Takeshita et al. | 165/62 |
| 4,509,337 A | 4/1985 | Wiart et al. | |
| 4,694,659 A | 9/1987 | Shelton | |
| 6,314,744 B1 | 11/2001 | Ogawa | |
| 2002/0053214 A1 | 5/2002 | Melendez et al. | |
| 2009/0090491 A1 | 4/2009 | Schweiger et al. | |

FOREIGN PATENT DOCUMENTS

| | | |
|---|---|---|
| DE | 4302281 | 7/1994 |
| DE | 4333829 | 4/1995 |
| DE | 19824315 | 6/1999 |
| DE | 19919605 | 11/1999 |
| DE | 19908666 | 9/2000 |
| DE | 10212688 | 10/2003 |
| DE | 102004052976 | 5/2006 |
| EP | 0841522 | 5/1998 |
| EP | 1076219 | 2/2001 |
| EP | 1610084 | 12/2005 |
| JP | 57104305 | 5/1984 |
| JP | 59072451 | 5/1984 |
| JP | 61066088 | 4/1986 |
| JP | 11281191 | 9/1990 |
| JP | 6257884 | 9/1994 |
| JP | 8178466 | 7/1996 |
| JP | 8303901 | 11/1996 |
| JP | 10122772 | 5/1998 |
| JP | 11159983 | 6/1999 |
| JP | 11223415 | 8/1999 |
| JP | 2001153377 | 6/2001 |
| JP | 2002081794 | 3/2002 |
| WO | WO 96/09504 | 3/1996 |

OTHER PUBLICATIONS

A comparative thermodynamic study of sorption systems: second law analysis. Meunier et al., International Journal of Refrigeration, vol. 19, No. 6, pp. 414-421, 1996.

Solid sorption heat powered cycles for cooling and heat pumping applications, Meunier, Applied Thermal Engineering, 18, pp. 715-729, 1998.

Equivalent Carnot cycles for sorption refrigeration, Meunier et al., International Journal of Refrigeration, vol. 21, No. 6, pp. 472-489, 1998.

Second Law Analysis of Adsorption Refrigeration Cycles: The Role of Thermal Coupling Entropy Production, Meunier et al., Applied Thermal Engineering 17, 43-55, 1997.

Adsorptive machines with advanced cycles for heat pumping and cooling applications, by M. Pons et al., International Journal of Refrigeration 22, 27-37, 1999.

"Schichtenspeichertechnologie für solare Warmwasserbereitung und Heizungsunterstützung" by Roland Sailer, Heizungsjournalm, dated Jun. 2000, p. 26-28.

Medium Temperature Collectors, IEA-SHC Task 33 report, ed. W. Weiss and M. Rommel, published May 2005.

Review of trends in solid sorption refrigeration and heat pumping technology, R.E. Critoph et al., published Jul. 28, 2004.

English-language abstract of DE 19908666.
English-language abstract of EP0384423.
English-language abstract of DE 10212688.
English-language abstract of EP 1076219.
English-language abstract of EP 0841522.
English-language abstract of DE 19824315.
English-language abstract of DE 4302281.
English-language abstract of DE 4333829.
English-language abstract of DE 19919605.
European Search Report in Application No. EP 2007/008021 filed Sep. 14, 2007 and English-language translation of the European Search Report.

\* cited by examiner

ADSORPTION HEAT PUMP WITH HEAT ACCUMULATOR

CROSS REFERENCE TO RELATED APPLICATIONS

The present application is a U.S. National Stage of International Application No. PCT/EP2007/008021 filed Sep. 14, 2007, which published as WO 2008/034561 A2 on Mar. 27, 2008, the disclosure of which is expressly incorporated by reference herein in its entirety. Further, this application claims priority under 35 U.S.C. §119 and §365 of German Application No. 10 2006 043 715.2 filed Sep. 18, 2006.

BACKGROUND OF THE INVENTION

1. Field of the Invention

The invention relates to an adsorption heat pump or an adsorption refrigeration machine and a heat accumulator suitable for efficient operation.

2. Background Description

The COP (Coefficient of Performance), i.e., the ratio of useful heat or useful cold to required driving heat, of adsorption refrigeration machines and adsorption heat pumps is typically lower than that of corresponding absorption plants under identical cycle conditions. A thermodynamic analysis (e.g., Meunier et al. 1996, 1997, 1998) shows that this lies in the adsorption above all at the entropy production, which occurs with a coupling of the adsorber to the heat sources and heat sinks of fixed temperature.

This is illustrated by the example of the refrigeration machine: the temperature of the adsorber fluctuates in the course of the cycle between the highest available desorption temperature and the lowest adsorption temperature at which the adsorption heat can still be emitted to the environment (recooling, e.g., in the cooling tower). The driving heat source (gas burner; solar system), however, generally supplies heat at a constant temperature level. The entropy production is thus greatest in the coldest state of the adsorber (at the start of the desorption phase). The situation with the entropy production during recooling is analogous: the recooler is generally kept at a constant temperature level, the entropy production is greatest here at the start of the adsorption phase, when the adsorber is hottest.

The entropy production for various adsorption cycles was examined in detail by the working groups around Meunier and Pons in France (see F. Meunier, F. Poyelle, M.D. LeVan: "Second Law Analysis of Adsorption Refrigeration Cycles: The Role of Thermal Coupling Entropy Production." Applied Thermal Engineering 17, 43-55, 1997, and M. Pons, F. Poyelle: "Adsorptive machines with advanced cycles for heat pumping and cooling applications," Internat. Journal of Refrigeration 22, 27-37, 1999). It was shown thereby that the entropy production can be clearly reduced and the COP clearly increased when the heat recovery is optimized. The aim is always to operate the adsorber in every operating condition with the lowest possible temperature difference to the heat source or heat sink. In practice, there is a minimal temperature difference that is required in order to be able to extract the desired output from the adsorber.

Essentially, two types are now proposed in the literature for realizing this heat recovery:

Firstly, a coupling of several adsorbers in a manner such that heat that is released in a still completely desorbed adsorber at the highest temperature level of the adsorption can be used for the desorption in another adsorber that is just at the start of its desorption phase.

Secondly, the realization of a "thermal wave" (U.S. Pat. No. 4,694,659) in a circuit with two adsorbers. A temperature gradient thereby passes through the two adsorbers switched one behind the other in a fluid circuit, wherein in the flow direction the reheater (the high temperature heat source) is switched between the adsorbing and the desorbing adsorbers and the recooler is switched between the desorbing and the adsorbing adsorbers (the average temperature heat sink). To switch over between desorption and adsorption, the flow direction of the fluid is reversed and the flow-through of recooler and reheater is switched over such that the aforementioned flow-through sequence results again.

The main disadvantage of the "thermal wave" is that the temperature gradient must be very steep for a significant increase of the COP, so that, e.g., during the largest possible part of the adsorption phase, the heat transfer fluid leaves the adsorber at the maximum adsorption temperature (and the amount of heat to be supplied by reheating is minimized). However, a steep temperature gradient also results in only a small part of the adsorber being active (i.e., adsorbs) at any time and the major part of the adsorber has either already completely adsorbed or has not yet started the adsorption. This has a negative effect on the power density of the refrigeration machine (specific cooling power, SCP). With the "thermal wave" there is therefore a marked conflict between a high COP and a high power density. Furthermore, with the "thermal wave" the entire adsorber must be flowed through serially, which results in long paths for the heat transfer fluid, and thus, high pressure losses and pump energy consumption. These problems may also have contributed to the fact that in the twenty years since the patent application of Shelton (U.S. Pat. No. 4,694,659) no adsorption heat pump or adsorption refrigeration machine has been brought on the market that realizes the principle of the "thermal wave."

The main disadvantage of arrangements with heat recovery between more than two adsorbers is the high expenditure in terms of equipment that is to be operated for the adsorbers (to be thermally insulated from one another) and their changing interconnections. The achievable COP increases herewith the number of adsorbers, at the same time, however, the expenditure in terms of equipment rises, and thus, the cost of the refrigeration machine/heat pump rises.

It can be generally stated with regard to the prior art for adsorption refrigeration machines that with respect to the technology of compression refrigeration machines that dominates the market above all, the power density (SCP) of the adsorption devices must be clearly increased further in order to achieve competitiveness. However, at the same time for many potential fields of application, the COP of the adsorption machines must also be increased in order, e.g., in the generation of the driving heat through a fossil fuel to achieve primary energy advantages with respect to current-driven compression devices.

In recent years marked progress has been achieved in the direction of a higher power density. Thus, e.g., SorTech AG developed a method for coating heat exchangers through the consumptive crystallization of zeolites on aluminum. This is described in DE 102004052976 A1 "Method for producing a substrate coated with a zeolite layer." Through the close thermal contact between zeolite and heat exchanger metal sheet and the small thickness of the zeolite layer, the adsorption output that can be extracted from the heat exchanger can be clearly increased compared to a packing or adhesion of zeolite pellets. Unfortunately, this improvement in the power density is first obtained at the cost of a reduction of the COP. Namely, due to the thin zeolite layer, the mass ratio of adsorbent to heat exchanger, and thus, via the adsorption cycle, the heat ratio of sorptive to sensible heat is lower than with comparable systems with zeolite packing. With an unfavorable sorptive/sensible heat ratio, such as can be expected for systems that render possible a high power density, increased efforts to increase the COP are therefore necessary. This applies both to the recovery of the sensible heat fed to the adsorber during the desorption, as well as the reduction of the entropy production through the coupling of the adsorber to the external heat sources and heat sinks.

In the unexamined German application DE 199 08 666 A1 entitled "Adsorption heat pump/refrigeration machine with heating of the previous adsorber to desorption temperature by adsorption," the use of a temperature-layered accumulator (stratified accumulator) in connection with an adsorption heat pump is described. It thereby relates primarily to a heat recovery between two evaporator/condenser components by a stratified accumulator. In the adsorption heat pump described here, the two adsorbers are operated according to the "thermal wave" principle. A component is permanently assigned to each adsorber, which component alternately takes over the function of the evaporator and condenser. Due to this special feature in the construction of the heat pump, through which valves between the adsorbers and evaporator/condenser can be omitted, the component carries out a corresponding temperature change with each change between evaporator and condenser function. Since the two components assigned to the two adsorbers change their function simultaneously, there is the possibility of a heat recovery between these two components. Different possibilities are described for realizing this heat recovery efficiently by a stratified accumulator.

Stratified accumulators are known from the prior art. Examples are described in DE 3905874 C2 and DE 10212688 A1 (Solvis) and EP 1076219 B1 (Sailer). According to their purpose of the stratification of heat from solar collectors and provision of heat for heating and domestic water, however, these accumulators do not contain any devices for temperature-controlled removal of fluid from selectable accumulator height.

SUMMARY OF THE INVENTION

The aim of the present invention is therefore to provide an adsorption heat pump that is simple to realize, which has the highest possible COP and at the same time a high power density. The aim of the invention is likewise to provide a method for operating an adsorption heat pump with a high COP and high power density.

This aim is attained through the independent claims.

Dependent claims disclose advantageous further developments.

It was recognized according to the invention that to attain the above aim an arrangement is to be provided, which has an adsorption heat pump and a heat accumulator. This arrangement has the following features:

Heat at different temperature levels can be stored in the heat accumulator simultaneously;

Adsorption heat released during the adsorption, which heat is not to be used for a later desorption, can be dissipated to a heat sink;

Adsorption heat that is to be used for the desorption can be stored in the heat accumulator at a temperature dependent on the adsorption temperature; and Desorption heat can be extracted at least in part from the heat accumulator at a desired temperature.

The decisive factor hereby is a heat accumulator in which heat can be stored at different temperature levels simultaneously. A heat accumulator is thus meant in which heat can be stored at different temperature levels without any appreciable mixing taking place and only one temperature level being available. It is not stated that heat can be fed to the accumulator at different temperature levels simultaneously. As a rule, the latter is neither possible nor necessary.

Adsorption temperature is, as usual, the temperature at which the heat released during the adsorption occurs. This is not the temperature at which the heat can be fed to the heat accumulator. Instead, the heat is always fed to the heat accumulator at a lower temperature. This is because a driving temperature difference is always necessary for the heat conduction. The level of the necessary temperature difference depends on the thermal resistance between the adsorber and the coolant that transports the heat into the heat accumulator and on the desired reaction rate. In order to be able to store the heat being released at the highest possible temperature, and thus, to increase the COP, it should be ensured that the lowest possible difference exists between the temperature of the coolant that transports the adsorption heat to the heat accumulator, and the temperature at which the heat is stored in the accumulator. The temperature at which the heat can be stored in the heat accumulator thus depends decisively on the adsorption temperature. As stated, however, the temperature differences that are necessary for heat conduction, are also reduced. Depending on the design of the arrangement, a cooling also occurs during the transport of the heat in the coolant, which is caused by heat losses.

The described possibility for storing heat permits necessary desorption heat at least in part to be extracted from the heat accumulator at a desired temperature. A complete extraction of the desorption temperature is not possible in continuous operation even under ideal conditions. The highest adsorption temperature, that is, the temperature that is released during the adsorption of the minimally charged adsorber, is lower than the temperature necessary for desorption of the minimally charged adsorber. Accordingly, the temperature of the adsorption heat being released during adsorption of the maximally charged adsorber is lower than the minimal desorption temperature. For this reason, a heat sink is present at which adsorption heat that is not to be used for a later desorption can be emitted. It is clear thereby that the heat that is available at a temperature below the minimal desorption temperature, cannot be used. However, there is also a temperature range above the minimal desorption temperature at which heat should not be stored, since a temperature difference is always necessary, as stated, for heat conduction, which temperature difference depends on the respective thermal resistances and the desired speed of the heat transport. In order to render possible a continuous operation of the adsorption heat pump, a heat source is provided with which heat necessary for the desorption can be provided at a temperature level that is higher than the temperature level achievable in the heat accumulator by previous adsorption cycles. If necessary, with the heat source, heat can also be provided which is available in the heat accumulator at a certain temperature level, but not in sufficient quantity.

It can be favorable for an energy-efficient operation for it to be possible to feed heat produced in the heat source to the heat accumulator at a selected temperature level. This applies in particular when a thermal solar collector is used as a heat source. Thermal solar collectors, as is known, have the problem that the efficiency decreases with increasing initial temperature of the solar collector, there being a maximum achievable temperature dependent on the design of the collector and the weather conditions. In order to be able to select the initial temperature suitable for the respective weather conditions, a heat accumulator is advantageous in which heat can be stored at different temperature levels simultaneously. It is understood thereby that the efficiency of the solar collector cannot be the sole factor in the selection of the initial temperature of the collector—that would result in a low initial temperature always having to be chosen—but the heat requirement of the accumulator for the next desorption cycle of the adsorber must also be taken into consideration. The heat can also come from sorption accumulators. Here, too, it is favorable to be able to feed heat to the heat accumulator at different temperatures, since the heat from the sorption accumulator occurs at different temperatures. However, other heat sources are also conceivable, which provide heat at different times at different temperature, such as waste heat from irregularly operated machines.

A particularly suitable heat accumulator results when the heat accumulator is embodied as a container that can be filled or is filled with a liquid heat transfer medium, in particular water or water-containing mixtures, with a temperature-dependent density. In this manner a temperature stratification in the accumulator is achieved through the temperature-dependency of the density. A stratified accumulator known in the prior art is thus realized. It is also possible thereby to store the heat transfer medium used to transport the heat, directly in the heat accumulator. This removes the necessity of the transfer of the heat from one heat transfer medium to another. The production of entropy is thus avoided.

The temperature stratification in the accumulator renders possible a simple feed or discharge of heat at a specific temperature, in that the corresponding level in the accumulator is simply selected. The measurement of the temperature in the accumulator can thus be omitted. It is sufficient to select the correct level for the feed or removal of temperature. If the heat source is embodied as a reheater for heat removed from the heat accumulator, a heat source can be realized in a simple manner. This can be formed, for example, by a gas-fired flow heater for heat transfer medium removed from the heat accumulator. In this manner, the entropy production is also limited, since the high temperature that can be obtained with a fossil or electrically heated heat source is not wasted for heating a cold heat transfer medium, but for the further heating of an already preheated heat transfer medium.

A heat source that can obtain its energy from a chemical reaction, in particular, the combustion of an energy source, is suitable as a heat source. Heat at a high temperature can be produced with fossil heat sources of this type. Even if the consumption of fossil energy, which of course is undesirable per se, is associated therewith, a clear reduction of the energy consumption is associated with the arrangement presented, compared to conventional plants for heating or cooling.

Since the heat source, in particular the aforementioned fossil-fired heat source, provides heat at a high temperature, the heat source can be embodied such that heat can be supplied only to the area of the accumulator in which the highest temperature can develop in the accumulator. In the case of a stratified accumulator this is the uppermost area, since the density decreases with increasing temperature.

In order to be able to supply the heat coming from the heat source efficiently to the heat accumulator, it is often advantageous if the heat can be supplied to different temperature levels of the heat accumulator depending on the operating condition. This applies primarily to heat sources in which the generation of heat of higher temperature can occur only with lower efficiency, such as, for example, the already mentioned thermal solar collectors. By taking into account the operating condition, for example, it can be recognized that heat is required at a lower temperature and the solar system can be operated accordingly.

An arrangement can be provided with which the heat source has the property that the total system effectiveness increases when heat is extracted from the heat source at the lowest possible thermodynamic medium temperature, wherein the heat source is in particular a solar collector or a sorption heat accumulator.

In order to discharge the water vapor occurring during the desorption of the adsorber, a condenser in which the water vapor can be condensed is useful. The condensate, that is, the liquid water, can be discharged into the environment or fed to the evaporator. In a closed system, which works under a vacuum, the condensate as a rule is discharged into the environment via a throttle valve or the like. To avoid unnecessary expenditure in terms of equipment, the heat of condensation released during the condensation can be discharged to the same heat sink to which the adsorption heat that cannot be used for the desorption is discharged. A heat exchanger that discharges the heat into the environment can hereby be considered as heat sink. The structure is fundamentally suitable for open systems, in which the water vapor occurs in an air/vapor mixture, as well as for closed systems, in which no air is present and pure water vapor is to be condensed.

A compact embodiment of the heat accumulator results through a heat accumulator that contains several phase change materials with respectively different phase change temperatures. The disadvantage of heat accumulators with phase change materials is that the thermal capacity is high only in the area of the phase change. When storage at different temperature levels is to occur anyway, this disadvantage is not important, if phase change materials with suitable phase change temperature are respectively used for the respective temperature levels.

With a stratified heat accumulator, as stated, the temperature is dependent on the height. A height-dependent extraction is thus at the same time a temperature-dependent extraction. It is often expedient in operation not to take the temperature in the accumulator as a basis, but only take into account the extraction height, which is a gauge of the temperature, in the regulation.

One possibility of extracting heat transfer medium from a stratified accumulator at different heights, and thus, different temperatures, lies in providing an extraction pipe in which blockable inlets, as a rule, valves, are present at different heights. The respective valve is opened depending on the stratum in which heat transfer medium is to be extracted. A system of this type is hydraulically simple and clearly arranged.

An alternative is to arrange several pipes immersed in the heat transfer medium at different depths. Although this entails a structure that initially appears complex, this avoids activating mechanisms and associated electrical connections being necessary in the area surrounded by the heat transfer medium.

An expedient possibility for controlling the extraction from the various pipes is to connect the pipes to a device that permits the extraction of heat transfer medium through respectively one pipe, while the other pipes are closed such that no heat transfer medium is removed through them. This is preferably realized through a corresponding multi-way valve. This can be arranged outside the area surrounded by the heat transfer medium.

In order to avoid a mixture of heat transfer media with different temperatures, it is expedient to arrange perforated sheets or sponge-like or fibrous structures horizontally in the heat accumulator. Of course, a mixture cannot be completely avoided thereby. However, even a partial prevention of the mixture is advantageous, since any mixture of heat transfer media of different temperature leads to an undesirable increase of the entropy. The inlets and outlets of the heat accumulator should be arranged between the perforated sheets such that the perforated sheets do not lose their effect as an obstacle to mixing.

Powerful adsorption heat pumps are achieved when the adsorbent requires a desorption temperature of more than 100° C. In this case the heat accumulator should be designed as a pressure accumulator for water or water-containing mixtures so that temperatures above 100° C. are possible in the heat accumulator.

An advantageous structure results when a multi-stage adsorption heat pump is used, in which at least one stage is realized by one of the arrangements proposed above. The use of multi-stage adsorption heat pumps of this type also depends on the conditions under which adsorption materials are available.

The method for operating the adsorption heat pump according to the invention is shown by the description of the adsorption heat pump, so that a fundamental description of the method is omitted to avoid repetitions. However, it should be stated that the most comprehensive possible storage of the heat released during the adsorption should be attempted, in order to achieve the highest possible COP. As already stated, a part of the adsorption heat occurs below the lowest desorption temperature, that is, below the temperature that is necessary to desorb the maximally charged adsorber. It is generally not expedient to store heat available in this temperature range, since this heat cannot be used for desorption. In order to transfer the heat from a heat transfer medium to the adsorber, a temperature difference is necessary, that is, the heat transfer medium must have a temperature above the respective desorption temperature. The lower the temperature difference, the longer the desorption lasts. Here a compromise is selected and/or determined in each individual case between a high COP aimed for and an adequate desorption rate, which determines the output of the adsorption heat pump. Which driving temperature difference is expedient for the desorption depends substantially on the heat transfer and flow conditions in the adsorber, that is, in the adsorption heat transfer medium. In the case of adsorbers with many parallel flow channels and high heat transfer value, a satisfactory desorption output is also already achieved even at low temperature rises of typically 2-10 K. In the case of adsorbers that are characterized by a large NTU (number of transfer units; $NTU=k*A/(m\_dot\ c\_p)$), which thus approach the "thermal wave" mode of operation, however, much higher driving temperature differences compared to the average adsorber temperature are expedient, typically 10 to 60K.

The use of thermal solar collectors is fundamentally expedient in order to save finite energy. One problem in the use of thermal solar collectors, however, is that the heat occurs at times other than when it is needed, and therefore, a storage must take place which is associated with effort, and thus, with expense. However, since a heat accumulator is necessary anyway with the current adsorption heat pump, the storage of the heat obtained in the thermal solar collector can be realized with low additional expenditure. It is therefore particularly advantageous to provide a thermal solar collector as heat source for the present adsorption heat pump.

With the supply of heat to the heat accumulator, of course, it must be ensured that the heat is supplied in a temperature range at which the desorption heat is required. However, in addition it is expedient to take into account the efficiency of the heat generation in the heat source. In particular, with thermal solar collectors, the efficiency depends substantially on the desired temperature, wherein the efficiency is reduced with higher temperature.

It is sometimes unnecessary to determine the temperature in the individual levels of the stratified accumulator. The heat can be extracted from a specific level of the accumulator depending on the degree of adsorption of the adsorber to be desorbed. Accordingly, the heat can be supplied depending on the degree of adsorption of the accumulator to be adsorbed from a specific level of the stratified accumulator.

In many cases it is advantageous to operate the heat source only when no heat can be removed from the heat accumulator at a temperature sufficient for desorption of the adsorber. For example, a gas burner can be easily switched on and off, and is therefore expediently only in operation when heat is actually needed at a temperature level not present in the accumulator.

A building can also be heated with the present adsorption heat pump. The heating of buildings is of particular interest when the heat accumulator is used as a seasonal accumulator, that is, heat obtained in sunny warm months is stored and removed in colder months. It is thus possible to store heat obtained with a thermal solar collector in sunny warm months and to use this heat in colder months to heat a building. It is possible thereby that the heat accumulator, which is designed for the exchange of adsorption and desorption heat, also takes on the function of the seasonal accumulator. However, a very large accumulator is necessary for this. An alternative is to use an additional seasonal accumulator. Sorption accumulators, above all zeolite accumulators, are possible here, with which heat can be supplied or extracted at a temperature above 100° C., without the accumulator having to be embodied as a pressure accumulator. Furthermore, sorption accumulators render possible the storage of a heat quantity with small space requirement. The additional accumulator can take on the function of the necessary heat source. Compared to previously known concepts of seasonal heat storage for heating buildings, much more useable heating energy can thus be obtained with the same stored amount of heat, since the stored amount of heat is not directly used for heating, but for driving the adsorption heat pump, which generates heating energy. This is applicable when an additional accumulator is used for seasonal heat storage, as well as when the heat accumulator present anyway takes over the function of seasonal storage.

A sorption heat accumulator from which the heat not present in the heat accumulator can be extracted can be considered at least in part as a heat source. It should be emphasized here that a heat accumulator is present in which adsorption heat can be stored and desorption heat can be discharged. In addition, a sorption heat accumulator is present from which heat that is not available at the required temperature or not in sufficient quantity can be extracted. To this extent, the sorption accumulator takes over the function of the heat source. The sorption accumulator itself, of course, must be charged with heat, such as from a solar system or a district-heating distribution system.

When a sorption accumulator is used as a heat source, the production of entropy can be reduced. To this end, the sorption accumulator is to be operated as a heat source such that several modules of the sorption accumulator are discharged in a parallel manner such that they are located in different adsorption states and heat can be removed from the module furthest desorbed at a higher temperature level than from the already further adsorbed module, and that it is switched over in the course of a desorption phase of the heat pump between the different accumulator modules as driving heat source.

An operating condition can occur in which in the accumulator fluid is still present at a temperature that would be sufficient for further desorption of the adsorber, but an extraction from the range of this temperature is not expedient since this temperature is unnecessarily high and the corresponding heat is expediently to be used for the desorption of the accumulator already further desorbed. In this case, it can be favorable to already switch the heat source upon the extraction of the heat from a lower temperature level in order to render possible the corresponding reheating.

Whether a reheating of this type is necessary depends primarily on the energy source for the high temperature level (that is, the reheater). If the system efficiency for providing this driving energy is virtually independent of the temperature level, e.g., with a burner that burns a chemical energy source, such as gas, oil or biomass, it is always expedient first to use the heat in the accumulator as far as possible for desorption and to switch the reheater in the uppermost accumulator layer only when the temperature falls below the required desorption temperature. However, if the system efficiency of the reheater depends on the temperature level (such as, e.g., with a solar collector or a sorption accumulator), the engagement described above of the reheater before the complete exhaustion of the stratified accumulator can be expedient. In this case, an expedient control criterion for the engagement of the reheater can be derived from the temperature gradient in the accumulator, the engagement follows then when a threshold value for the temperature gradient is exceeded between the current extraction point and the higher accumulator strata.

BRIEF DESCRIPTION OF THE DRAWINGS

Without restricting the generality, the invention, in particular the arrangement of the components of the heat pump system according to the invention, is described below in more detail.

They show.

DETAILED DESCRIPTION OF THE INVENTION

Figure 1:
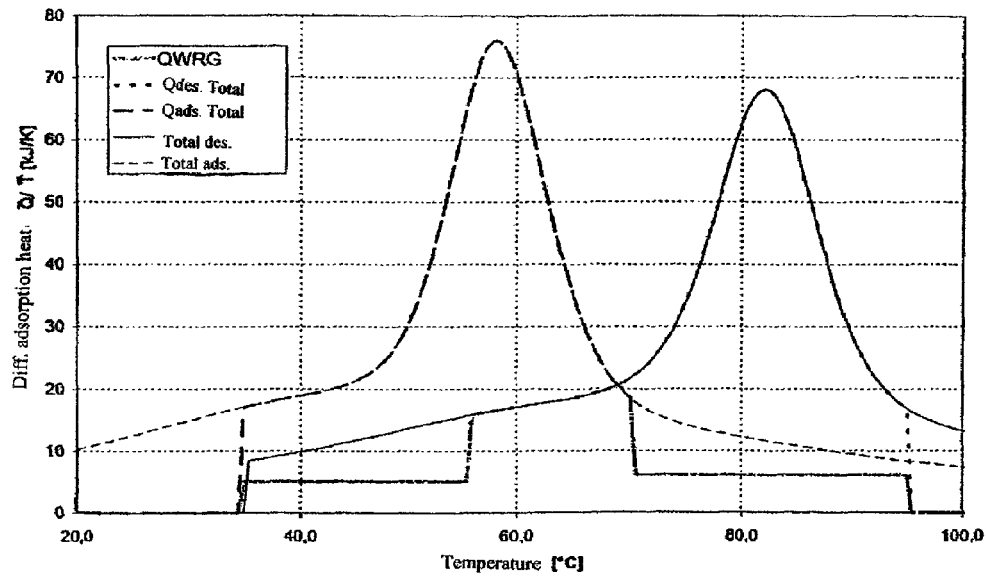
FIG. 1 The desorption heat to be supplied and the released adsorption heat for an adsorber with the pair of substances SAPO-34/water, which is operated in the cycle of an adsorption refrigeration machine under conditions which are typical for solar-supported building cooling: maximum desorption temperature 95° C., recooling and minimal adsorber temperature 35° C., evaporator temperature 15° C.

As shown in FIG. 1, these curves calculated from the adsorption equilibria of the pair of substances show which amount of heat must be supplied to the adsorber at which temperature for the desorption and how much heat can be extracted from the adsorber during the adsorption at which temperature level. Driving temperature differences between the heat transfer fluid and the adsorber are not yet taken into account here. By taking them into account, the peaks of the adsorption and desorption curve would be pushed further apart, since during the desorption the heat transfer fluid must be warmer than the adsorbent and colder during the adsorption. The intersection under the two curves describes the maximum amount of heat that can be recovered between the desorption and adsorption process. It is composed of a sensible and a sorptive proportion. To maximize the COP, the largest possible part of this amount of heat under the adsorption curve should be used for the desorption (of another adsorber or of the same adsorber in a later phase of the cycle).

Figure 2:
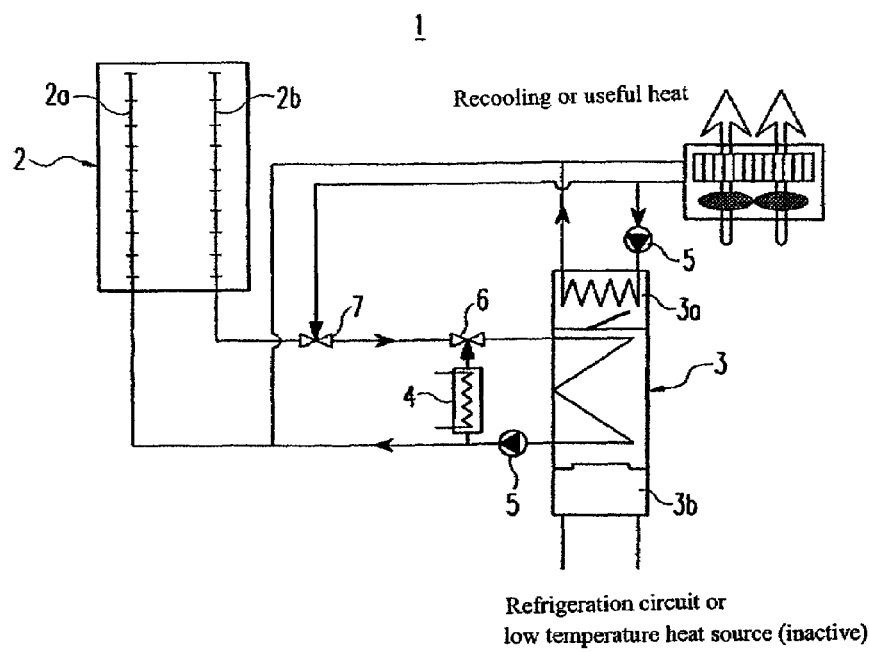
FIG. 2 A possible hydraulic interconnection of the components in the heat pump system according to the invention.

FIG. 2 shows a possible hydraulic interconnection of the components in the heat pump system according to the invention. The stratified accumulator 2 is always in the hydraulic circuit, the mixers V1 6 and V2 7 are controlled such that only the available energy can be extracted or supplied via the volume flow ratio to the accumulator 2, the remaining energy is extracted for desorption from the reheater 4 or excess energy during the adsorption is extracted via the recooling system. It is thus possible to trace the desorption heat curve of the adsorber according to FIG. 1, wherein at each temperature the recyclable amount of heat (according to the section of the curves) is extracted from accumulator 2 and the heat additionally needed (between adsorption curve and desorption curve) from the reheater 4.

The operation of the adsorber according to this interconnection, however, would require a high control expenditure, since the volume flows from stratified accumulator 2 and reheater 4 would have to be adjusted for each temperature according to the heat ratio required just then. It was recognized according to the invention that a virtually ideal heat recovery is possible even with a simplified hydraulic interconnection.

If a chemical energy source is used for the reheater 4 (e.g., gas burner), it has no advantage in terms of thermodynamics to extract heat therefrom at the lowest possible temperature level. In this case a numerical analysis of the stratified accumulator cycles shows that it is advantageous to first desorb the adsorber as far as possible with heat from the stratified accumulator 2 and to engage the reheater 4 only when the temperature of the uppermost accumulator layer is no longer adequate for the desorption. From this point on the accumulator 2 can either be separated completely from the hydraulic circuit and the adsorber 3 short-circuited with the reheater 4, or the accumulator 2 can be flowed through in the circuit with the reheater 4 and the adsorber 3 only in the uppermost layer (in any case as soon as the adsorber return has reached the highest accumulator temperature).

The situation is different when the heat source of the reheater is a solar collector (the efficiency of which decreases with increasing collector temperature) or when this heat source is a heat accumulator, the usable rise in temperature of which is to be maximized. Then it is advantageous for the overall system to operate the reheater 4 at the lowest possible temperature. The numerical analysis of the stratified accumulator cycles shows that the thermodynamic average temperature of the reheating with respect to the above-referenced case can be reduced if the reheater 4 is already engaged earlier in the desorption process (before the temperature of the uppermost accumulator layer is reached). The engagement of the reheater 4 can be controlled based on the temperature gradient in the accumulator 2: when the temperature of the fluid extracted from the accumulator 2 rises sharply with an only slightly higher extraction and is clearly above the currently required desorption temperature, the extraction level is reduced again somewhat and the reheater 4 is engaged. The layers of higher temperature available in the accumulator 2 are subsequently "saved" thereby until the adsorber 3 needs this temperature level for desorption and at the same time the (thermodynamically, therefore entropically) average temperature level of the reheating can be reduced.

A major advantage of the heat pump system according to the invention is that it is very suitable for operation under changing cycle conditions: if, for example, a higher evaporator temperature is available in the heat pump application for a few cycles (the required temperature rise between the evaporator and condenser is thus reduced), the intersection between the two heat curves is enlarged and the system automatically reaches a higher COP.

The necessary accumulator size for realizing the optimal heat recovery depends substantially on the course of the heat curves (FIG. 1). In general, a larger accumulator volume is needed for the reheating just described with sliding temperatures than for the (fossil) reheating at maximum temperature. In the case of the coupling to a solar system, however, the stratified accumulator 2 can be integrated into the solar buffer accumulator needed anyway (i.e., this is equipped with the corresponding charge and discharge devices 2a, 2b). This represents a preferred embodiment of the system according to the invention, since then only one accumulator system is necessary, which is useful for the solar system as well as for the heat pump/refrigeration machine.

In an advantageous embodiment of the system according to the invention the heat source of the reheating is a sorption accumulator, particularly preferably a zeolite accumulator, in particular with a zeolite of the LTA type. This zeolite accumulator is preferably structured in a modular manner and is operated such that the modules are not completely adsorbed successively, but several modules that are in different adsorption states, that is, can provide heat at different temperature levels, are always used in a parallel manner. The module of the zeolite accumulator, the adsorption temperature of which is just high enough, is then always used as a heat source for the reheater 4 for the stratified accumulator 2. A system of this type is particularly suitable for the seasonal solar heat storage with solar collectors, such as are currently being developed for process heat applications in the temperature range of 100-250° C. With these collectors a direct solar desorption of a zeolite accumulator with zeolites (e.g., 4A) available cheaply is possible. The effective accumulator density of the zeolite accumulator is increased through the operation with the heat pump system according to the invention, since the stored heat is not used directly for building heating, but for operating the COP-optimized heat pump. A heat accumulator is thus possible with effective energy density of up to 250 kWh/m3 with cheap zeolite that is available on the market.

In connection with systems for thermal solar energy use, the heat pump system according to the invention has further advantages or renders possible the use of synergistic effects. For example, in the application of the solar-supported building cooling, the COP of the refrigeration machine can be increased by the utilization of the day/night temperature difference. To this end, a cold accumulator is integrated into the system, which, for example, contains a phase change material, the melting point of which lies just above the outdoor night temperature (for moderate climates, e.g., at 26° C.). This accumulator can emit heat into the environment at night via the recooler of the heat pump, wherein only the pump energy has to be added for the circulation of the heat transfer fluid. During the day, the stored "cold" can be used to reduce the condenser temperature in specific phases of the refrigeration machine cycle. This is expedient in particular at the end of the desorption phase of the adsorber(s) 3, because by reducing the condenser temperature a further desorption at lower temperature is possible, so that more heat that is still in the stratified accumulator 2 from the last adsorption cycle can be used for desorption. Thus, the reheater 4 has to generate a lower amount of heat and/or the reheating heat can be supplied at lower temperature (thus higher collector efficiency). The heat pump system according to the invention thus implements the effect of the cold accumulator in a higher COP of the refrigeration machine or a higher efficiency of the overall system.

If hydrophilic zeolites are used as adsorbents (e.g., zeolites A, X, Y), high desorption temperatures (typically 150° C.) are needed. If only one temperature rise of 20-30 K is needed for the application (e.g., for the solar cooling with cooling ceilings or the heating with ground-coupled heat exchangers and low temperature radiant panel heating), the intersection between the very flat adsorption and desorption heat curves of the zeolite is very large. Thus, a large portion of the adsorption heat in the stratified accumulator 2 can be temporarily stored and used for desorption, so that a high COP can be achieved. With the system according to the invention, it is in principle possible to achieve COP values that can otherwise be achieved only with multi-stage sorption heat pumps. Whether this is actually successful depends above all on the quality of the temperature stratification in the stratified accumulator 2 and the precision of the control of the loading and discharge height of the accumulator 2. Therefore a few advantageous embodiments of the stratified accumulator 2 are described below.

Typically, higher power-based volume flows through the stratified accumulator 2 are necessary for the operation of the heat pump than is the case with thermal solar systems, since the temperature spread in the adsorber 3 in typical cases will be much smaller than in the solar collector. High volume flows represent a challenge for every stratified accumulator, since high flow rates very easily lead to eddies and mixtures in the accumulator which destroy the temperature stratification. Stratified accumulators known from solar technology, such as the accumulator by Solvis provided with membrane flaps (DE 3905874 C2), are likely to prove unsuitable for the application according to the invention. The stratified accumulator 2 of the system according to the invention should therefore preferably have devices that prevent the vertical mixing of the accumulator. This can be achieved, e.g., by perforated sheets lying horizontally in the accumulator with small spacing. Preferably flow damping structures are integrated into the accumulator near the fluid inlets and outlets of the stratification and unstratification pipes, for example, sponge-like or fibrous structures. In a preferred embodiment the referenced perforated sheets are solid in the vicinity of the fluid inlets and outlets, so that no vertical mixing is possible at these points. Preferably an annular damping structure is attached around the fluid inlets and outlets between respectively two perforated sheets, which annular damping structure leads to a reduction of the local flow rate and to an homogenization of the flow over the circumference of the damping ring. The stratification of the adsorber return into the accumulator can in principle occur passively, e.g., via the devices described in EP 1076219 B1 and in the article "Schichtenspeichertechnologie für solare Warmwasserbereitung and Heizungsunterstützung" by Roland Sailer, Heizungsjournal Juni 2000, p. 26-28.

In order to combat problems in the mixing of the accumulator, it can be expedient to enlarge the temperature spread in the adsorber run and to reduce the volume flow accordingly. In this case it is expedient to design the adsorber 3 similar to the case of a "thermal wave" (see description by the characteristic numbers in U.S. Pat. No. 4,694,659). A major difference to the operation of the adsorber in the case of the "thermal wave" remains that the wavelength of the "thermal wave" in the system according to the invention may be longer than the adsorbent bed flowed through, whereas according to U.S. Pat. No. 4,694,659 it should be shorter than the adsorbent bed. In the system according to the invention, the return temperature from the adsorber 3 thus does not remain near to the maximum adsorption temperature up to shortly before the end of the adsorption process, but drops significantly beforehand. In contrast to the "thermal wave" arrangement according to Shelton (U.S. Pat. No. 4,694,659), with the present invention this does not have a negative effect on the COP due to the stratified accumulator 2. The design of the adsorber 3 as a heat exchanger with an extended path for the heat transfer fluid here has the purpose only of rendering possible an operation of the adsorber 3 with a great temperature spread between inlet and outlet without major internal irreversibilities (through heat conduction within the adsorber 3) in order to thus be able to reduce the volume flow through the stratified accumulator 2 and to achieve a better accumulator stratification.

In the case of the use of adsorbents that require desorption temperatures of more than 100° C., the embodiment of the stratified accumulator 2 as a pressure accumulator can be expedient, so that water can be used as the main constituent of the heat transfer fluid. Also with thermal solar collectors for the "medium temperature range" of approx. 100° C.-250° C. there are tendencies in development to use pressurized water instead of heat transfer oil (see, e.g., "Medium Temperature Collectors," IEA-SHC Task 33 report, ed. W. Weiss and M. Rommel, May 2005; http://energytech.at/pdf/medium_temperature_collectors_task33.pdf). Collector systems of this type can feed directly into the stratified accumulator 2 of the heat pump without requiring an additional heat exchanger. In general the stratification from the solar collector in the accumulator 2 in many cases can occur advantageously via a stratified charging lance 2a corresponding to the prior art (passively, i.e., controlled via the density differences of the fluid in the accumulator 2). The temperature (and stratification height) of the fluid from the collector can be controlled via a regulation of the volume flow through the collector in order to approach the stratification profile of the accumulator 2 necessary for the desorption and to minimize the requirement for non-solar reheating energy.

In an advantageous embodiment of the system according to the invention the reheater 4 is integrated into the upper area of the stratified accumulator 2, such as is known, e.g., from the prior art of solar combined plants (e.g. EP 0841522 A2).

LIST OF REFERENCE NUMBERS

1: Hydraulic interconnection
2: Stratified accumulator
2a: Charging lance
2b: Discharging lance
3: Adsorber
3a: Condenser
3b: Evaporator
4: Reheater
5: Pump
6: Mixer V1
7: Mixer V2

The invention claimed is:

1. A system comprising:
an adsorption heat pump with at least one adsorber and at least one heat accumulator; and
a heat source configured to provide heat for a desorption at a temperature that is at least one of:
higher than temperature levels achievable through previous adsorption cycles in the at least one heat accumulator; and
not sufficiently available in the at least one heat accumulator, wherein:
the at least one heat accumulator is structured and arranged to simultaneously store heat at different temperature levels therein,
adsorption heat released during an adsorption, which is not to be used for a later desorption, is dissipated to a heat sink,
adsorption heat to be used for the later desorption is stored in the heat accumulator at a temperature dependent on an adsorption temperature, and
desorption heat is extractable at least in part from the at least one heat accumulator at a desired temperature.

2. The system of claim 1, wherein the heat source comprises a thermal solar collector.

3. The system of claim 1, wherein heat produced in the heat source is supplied to the at least one heat accumulator at a selected temperature level.

4. The system of claim 1, wherein the at least one heat accumulator comprises a container structured and arranged to contain a liquid heat transfer medium with a temperature-dependent density.

5. The system of claim 4, wherein the container is structured and arranged to contain one of water and water-containing mixtures.

6. The system of claim 1, wherein heat is at least one of fed to and extracted from the at least one heat accumulator at different levels of the at least one heat accumulator.

7. The system of claim 1, wherein the heat source comprises a reheater for the desorption heat extracted from the at least one heat accumulator.

8. The system of claim 1, wherein the heat source obtains energy from a chemical reaction.

9. The system of claim 8, wherein the chemical reaction comprises a combustion of an energy source.

10. The system of claim 1, wherein the heat source is structured and arranged to supply heat only to an area of the at least one heat accumulator in which a highest temperature can develop in the heat accumulator.

11. The system of claim 1, wherein the heat source is structured and arranged to supply heat to different temperature levels of the at least one heat accumulator depending on an operating condition of the system.

12. The system of claim 1, wherein a property of the heat source is that a total system effectiveness increases when heat is extracted from the heat source at a lowest possible thermodynamic medium temperature.

13. The system of claim 12, wherein the heat source is one of a solar collector and a sorption heat accumulator.

14. The system of claim 1, further comprising the heat sink, wherein the heat sink is structured and arranged for emitting adsorption heat and for emitting heat occurring in a condenser assigned to the at least one adsorber.

15. The system of claim 1, wherein the at least one heat accumulator comprises phase change materials with different respective phase change temperatures.

16. The system of claim 1, wherein the at least one heat accumulator comprises a device structured and arranged to extract a heat transfer medium from the at least one heat accumulator one of at a desired temperature and at a desired height of the at least one heat accumulator.

17. The system of claim 16, wherein the device comprises an extraction pipe having blockable inlets attached at different heights of the extraction pipe immersed in the heat transfer medium.

18. The system of claim 16, wherein the device comprises pipes immersed in the heat transfer medium at respective different depths of the at least one heat accumulator.

19. The system of claim 18, wherein the pipes immersed in the heat transfer medium at different depths are connected to a routing device, which permits extraction of the heat transfer medium through respectively one pipe.

20. The system of claim 19, wherein the routing device comprises a multi-way valve.

21. The system of claim 16, wherein the at least one heat accumulator further comprises installations structured and arranged to prevent a mixing of the heat transfer medium at different temperature.

22. The system of claim 21, wherein the installations comprise one of perforated sheets and sponge fibrous structures.

23. The system of claim 1, further comprising an adsorbent requiring a desorption temperature of more than 100° C., and wherein the at least one heat accumulator is structured and arranged as a pressure accumulator for water or water-containing mixtures.

24. The system of claim 23, wherein the adsorbent comprises a zeolitic.

25. A multi-stage adsorption heat pump, wherein at least one stage comprises the system of claim 1.

26. A method for operating an adsorption heat pump comprising alternating adsorption and desorption of an adsorber comprising:
   adsorbing the adsorber and emitting to a suitable heat sink released adsorption heat available at a temperature that cannot be used for the desorption;
   supplying adsorption heat available at a temperature that can be used for the desorption to a heat accumulator structured and arranged to simultaneously store heat at different temperature levels, wherein the adsorption heat is stored at a temperature level dependent on a respective adsorption temperature;
   desorbing the adsorber with desorption heat extracted from the heat accumulator at a temperature dependent on a respective desorption temperature; and
   providing additional desorption heat from a heat source at least one of at a temperature and in a quantity not available in the heat accumulator.

27. The method of claim 26, wherein the heat source comprises a thermal solar collector.

28. The method of claim 26, wherein a selection of the temperature at which the adsorption heat is supplied to the heat accumulator comprises accounting for an efficiency of heat production in the heat source.

29. The method of claim 26, wherein the heat accumulator comprises a stratified accumulator, wherein:
   a different temperature is present at different heights;
   the desorption heat is extracted from a specific height of the stratified accumulator depending on a degree of adsorption of the adsorber to be desorbed; and
   the adsorption heat is fed to a specific height of the stratified accumulator depending on a degree of adsorption of the adsorber to be adsorbed.

30. The method of claim 26, wherein the heat source is operated only when no heat can be extracted from the heat accumulator at a temperature sufficient for the desorption of the adsorber.

31. The method of claim 26, further comprising heating a building with the adsorption heat pump.

32. The method of claim 26, further comprising using a sorption accumulator embodied as a seasonal heat accumulator as the heat source.

33. The method of claim 32, wherein during a discharge of the sorption accumulator to drive the adsorption heat pump, several modules of the sorption accumulator are discharged in a parallel manner such that they are located in different adsorption states and heat can be extracted from a module furthest desorbed at a higher temperature level than from an already further adsorbed module, the method further comprising switching between the different accumulator modules as the heat source in the course of a desorption phase of the heat pump.

34. The method of claim 26, wherein in the desorption of an adsorber when strata are available in the accumulator having a temperature sufficient for further desorption of the adsorber, the heat source is switched to reheat fluid.

35. The method of claim 34, wherein when the fluid is extracted from a defined minimum height of the heat accumulator and a temperature gradient at an extraction point exceeds a preset threshold value, the heat source is switched to reheat the fluid during the desorption of an adsorber.

* * * * *

UNITED STATES PATENT AND TRADEMARK OFFICE
CERTIFICATE OF CORRECTION

PATENT NO. : 8,631,667 B2  Page 1 of 1
APPLICATION NO. : 12/441673
DATED : January 21, 2014
INVENTOR(S) : Munz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1261 days.

Signed and Sealed this
Twenty-second Day of September, 2015

Michelle K. Lee
*Director of the United States Patent and Trademark Office*